United States Patent
Buradagunta et al.

(10) Patent No.: US 12,100,014 B2
(45) Date of Patent: *Sep. 24, 2024

(54) METHOD AND SYSTEM FOR PROVIDING A SERVICE NODE WITHIN A BLOCKCHAIN

(71) Applicant: Mastercard International Incorporated, Purchase, NY (US)

(72) Inventors: Sarala Buradagunta, West Orange, NJ (US); Rakesh Yadav, Cape Elizabeth, ME (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,438

(22) Filed: Apr. 19, 2023

(65) Prior Publication Data

US 2023/0342788 A1 Oct. 26, 2023

Related U.S. Application Data

(63) Continuation of application No. 16/810,201, filed on Mar. 5, 2020, now Pat. No. 11,663,610.

(51) Int. Cl.
*G06Q 30/018* (2023.01)
*G06F 16/23* (2019.01)
(Continued)

(52) U.S. Cl.
CPC ....... *G06Q 30/018* (2013.01); *G06F 16/2365* (2019.01); *G06Q 20/04* (2013.01);
(Continued)

(58) Field of Classification Search
USPC ......................................................... 705/39
See application file for complete search history.

(56) References Cited

U.S. PATENT DOCUMENTS 10,135,835 B1 * 11/2018 Kandel et al. .......... H04L 29/06
10,552,601 B2 * 2/2020 Kilpatrick ............... G06F 21/44
(Continued)

OTHER PUBLICATIONS

Shala, Besfort, et al., Novel trust consensus protocol and blockchain-based trust evaluation system for M2M application services, May 11, 2019, Internet of Things, 7 (2019) (Year: 2019).*

(Continued)

*Primary Examiner* — Scott C Anderson
*Assistant Examiner* — George N. Proios
(74) *Attorney, Agent, or Firm* — Panitch Schwarze Belisario & Nadel LLP

(57) ABSTRACT

A method and system of providing a service node within a blockchain network. The method includes storing, in a memory of a processing server, a blockchain comprised of a plurality of blocks, wherein each block is comprised of at least a block header and one or more data values, wherein the one or more data values included in a most recent block includes at least one data point associated with services or functions of at least a first service node; receiving, by a receiving device of the processing server, a request from a second service node for the list of services or functions of the at least a first service node within the blockchain network; and validating, by the processing server, the request from the second service node for the list of services or functions of the at least a first service node within the blockchain network.

16 Claims, 5 Drawing Sheets

(51) Int. Cl.
*G06Q 20/04* (2012.01)
*G06Q 40/02* (2023.01)
*H04L 9/06* (2006.01)
*H04L 9/00* (2022.01)

(52) U.S. Cl.
CPC ........... *G06Q 40/02* (2013.01); *H04L 9/0637* (2013.01); *H04L 9/50* (2022.05)

(56) References Cited

U.S. PATENT DOCUMENTS

| | | | | |
|---|---|---|---|---|
| 10,554,753 | B2* | 2/2020 | Tormasov et al. | H04L 29/08 |
| 10,742,313 | B1* | 8/2020 | Favarolo et al. | G06F 9/50 |
| 10,755,322 | B2* | 8/2020 | Kilpatrick | G06Q 40/04 |
| 10,762,478 | B1* | 9/2020 | Hyun et al. | G06Q 20/06 |
| 2017/0346693 | A1* | 11/2017 | Dix et al. | H04L 12/24 |
| 2018/0253464 | A1* | 9/2018 | Kohli et al. | G06F 17/30 |

OTHER PUBLICATIONS

De Lange, Peter et al , "Decentralized Service Registry and Discovery in P2P Networks Using Blockchain 3 Technology", Apr. 26, 2019, Advances in Databases and Information Systems; Springer International Publishing, ☐ Cham, pp. 296-311. (Year: 2019).*

Gao, Zhenfeng et al., "DSES: A Blockchain-powered Decentralization Service Eco-System", 2018 IEEE 11th International Conference on Cloud Computing, Jul. 2, 2018, pp. 25-32. (Year: 2018).*

Shala, Besfort, et al., Novel trust consensus protocol and blockchain-based trust evaluation system for M2M application services, May 11, 2019, Internet of Things, 7 (2019).

Notification of Transmittal of the International Search Report (Forms PCT/ISA/220 and PCT/ISA/210) and the Written Opinion of the International Searching Authority (Form PCT/ISA/237) issued Jun. 13, 2021, by the Israel Patent Office in corresponding International Application No. PCT/US2021/020587 (9 pages).

Extended European Search Report, dated Feb. 19, 2024, issued in corresponding European Application No. 21765472.2-1218, 10 pages.

Halim, Kanisius Kenneth et al, "Dicey: A Blockchain Based Decentralized Service Registry", 2019 International Conference on Data and Software Engineering, IEEE, Nov. 13, 2019, 6 pages.

De Lange, Peter et al, "Decentralized Service Registry and Discovery in P2P Networks Using Blockchain Technology", Apr. 26, 2019, Advances in Databases and Information Systems; Springer International Publishing, Cham, pp. 296-311.

Gao, Zhenfeng et al, "DSES: A Blockchain-powered Decentralization Service Eco-System", 2018 IEEE 11th International Conference on Cloud Computing, Jul. 2, 2018, pp. 25-32.

Yoon, Wondeuk et al, "BlockONS: Blockchain based Object Name Service", 2019 IEEE International Conference on Blockchain and Cryptocurrency (ICBC), IEEE, May 14, 2019, pp. 219-226.

* cited by examiner

METHOD AND SYSTEM FOR PROVIDING A SERVICE NODE WITHIN A BLOCKCHAIN

TECHNICAL FIELD

The present disclosure generally relates to method and system for providing a service node within a blockchain, and more particularly, to a method and system for providing a service node that provides application programming interfaces (APIs) and services to other service nodes via a subscription.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. New blocks are added to the blockchain through a process known as "consensus." In a traditional consensus process, blockchain nodes work to generate a new block that satisfies all requirements, a process known as "mining," and then will share the new block with other nodes. The other nodes will confirm that the block is suitable and then distribute the block throughout the blockchain, which effectively adds that block into the blockchain and moves the nodes on to working on consensus on the next block.

Currently, there is a need for a technical solution whereby a service node, for example, an approved service directory, can offer additional services to subscribed users (i.e., other service nodes), for example, an issuer or acquirer, through application programming interfaces (APIs) and services within a blockchain network that eases service discoverability, and which services are not available to the other service nodes through an existing a peer-to-peer network (P2P).

SUMMARY

The present disclosure provides a description of exemplary systems and methods to provide a service node within a blockchain node, which can validate a request for a list of services or functions of at least a first service node within the blockchain network, and transmits the list of service or functions of the at least the first service node within the blockchain to the second service node.

A method of providing a service node within a blockchain network includes: storing, in a memory of the processing server, a blockchain comprised of a plurality of blocks, wherein each block is comprised of at least a block header and one or more data values, wherein the one or more data values included in a most recent block includes at least one data point associated with services or functions of at least a first service node; receiving, by a receiving device of the processing server, a request from a second service node for the list of services or functions of the at least a first service node within the blockchain network; validating, by the processing server, the request from the second service node for the list of services or functions of the at least a first service node within the blockchain network; and electronically transmitting, by a transmitting device of the processing server, the list of service or functions of the at least the first service node within the blockchain to the second service node.

A system for providing a service node within a blockchain, the system includes: a blockchain network comprised of a plurality of blocks, wherein each block is comprised of at least a block header and one or more data values, wherein the one or more data values included in a most recent block includes at least one data point associated with services or functions of at least a first service node; and a processing server configured to: receive a request from a second service node for the list of services or functions of the at least a first service node within the blockchain network; validate the request from the second service node for the list of services or functions of the at least a first service node within the blockchain network; and electronically transmit the list of service or functions of the at least the first service node within the blockchain to the second service node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
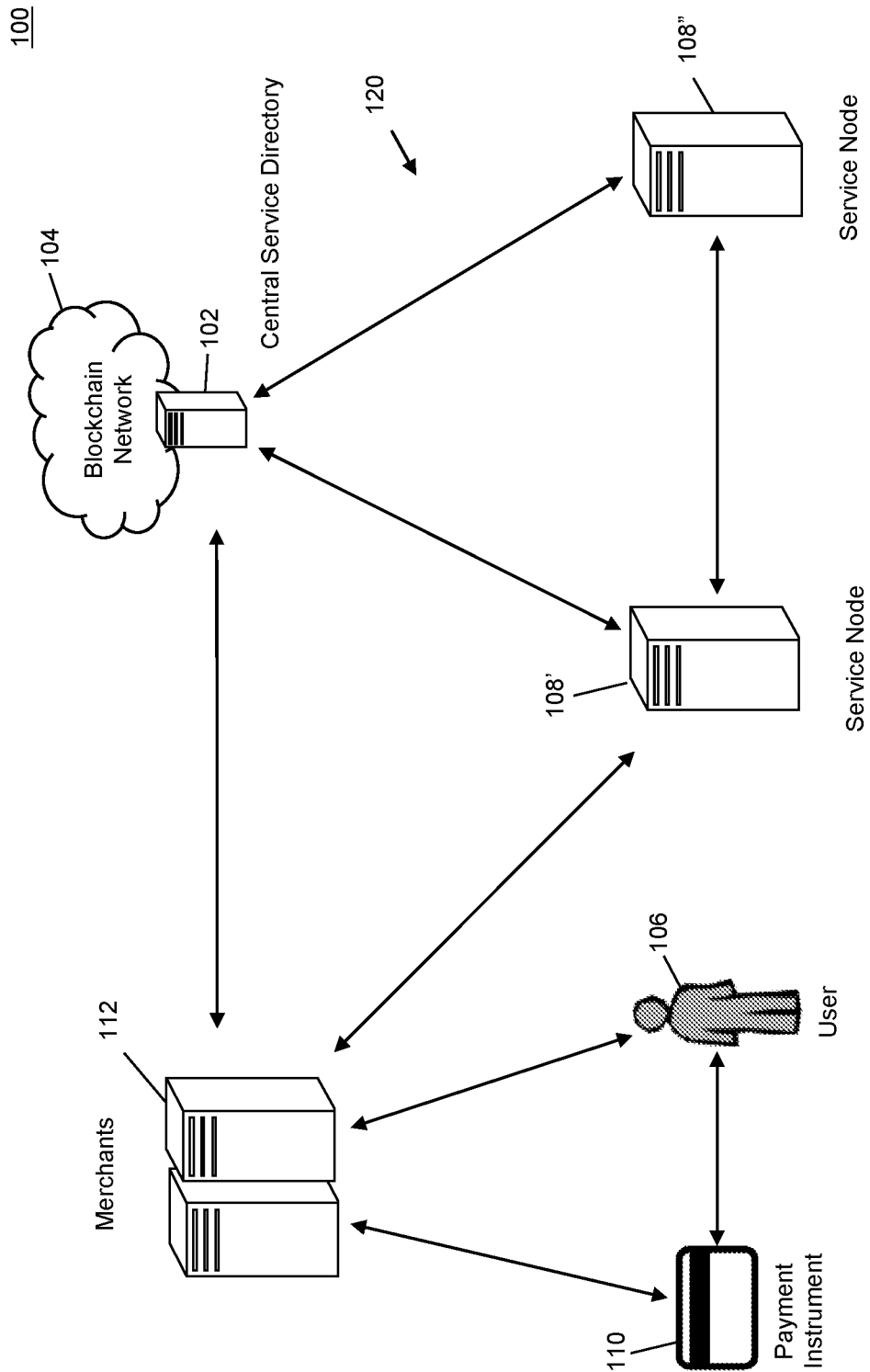
FIG. 1 is a block diagram illustrating a high-level system architecture for providing a service node within a blockchain network in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency or network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Providing a Service Node Using a Blockchain Network

FIG. 1 illustrates a system 100 for providing a service node within a blockchain network.

The system 100 may include a processing server 102. The processing server 102 may be one of a plurality of nodes or processors comprising a blockchain network 104. The blockchain network 104 may be associated with one or more blockchains, which may be used to store data associated with service nodes 108', 108" (e.g., issuers or issuing institutions) across a plurality of different service nodes 108', 108". The processing server 102 (for example, a central service directory or service node) may be configured to generate and validate new blocks that are added to the blockchain, where the validation process for a new block may involve mathematical verification of data stored therein across a plurality of the nodes comprising the blockchain network 104. The processing server 102, discussed in more detail below with respect to FIG. 2, may be configured to obtain services provided by 108', 108", store such data in a new block that is generated and added to the blockchain, and, in some cases, may provide services to merchants 112 in addition to service nodes 108', 108".

In the system 100, for example, a user 106 may purchase a service or product from one or merchants 112 or other entities with, for example, a payment instrument 110. As referred to herein, a "merchant" may refer to any entity that provides products (e.g., goods and/or services) for purchase by another entity, such as a consumer or another merchant (i.e., user 106).

In an embodiment, the system 100 may include one or more service nodes 108', 108" (i.e., issuers or issuing institutions). The service nodes 108', 108" may be a financial institution, such as an issuing bank, or other suitable entity that is configured to issue a transaction account to the user 106 for use in funding payment transactions. The service nodes 108', 108", for example, issuer or issuing institution may issue a transaction account to the user 106 and, as part of the issuing of the transaction account, may issue a payment instrument 110 to the user 106. The payment instrument 110 may be, for instance, a credit card, virtual payment card, check, etc. The payment instrument 110 may be encoded with, include, or be otherwise associated with payment credentials corresponding to a transaction account. The payment credentials may include any data that must be communicate as part of a transaction process for the transaction to be funded via the related transaction account, such as a primary account number, expiration date, and security code.

In accordance with an embodiment, the processing server 102 may be configured to provision a new set of nodes, for example, service nodes that provide services, for example, an application programming interface (APIs) and/or related services of the one or more service nodes 108', 108", for example, an issuer or banking node, that each of the one or more service nodes 108', 108" may subscribe. The services can be, for example, an API and/or a functionality that provides a service and/or functionality otherwise unavailable to the nodes of a peer-to-peer (P2P) network between the one or more service nodes 108', 108". In accordance with an embodiment, the processing server 102 and the blockchain network 104, and the one or more service nodes 108', 108" may constitute a blockchain service network 120. In accordance with an embodiment, the processing server 102 may constitute a service registry in which the one or more service nodes 108', 108" can send information to the service registry (i.e., processing server 102) about the address of the one or more service nodes 108', 108", and services being offered.

In accordance with an embodiment, each of the one or more service nodes 108', 108" can initially join the processing server 102 and the blockchain network 104 via, for example, a transmission control protocol (TCP) connection or other protocol that secure to provide types of services provided by the one or more service nodes 108', 108". For example, the types of services provided by the one or more service nodes 108', 108", can be provided, for example, via application programming interfaces (APIs), for transaction financial transactions between, for example, banks or financial institutions.

In accordance with an embodiment, the types of services provided by each of the one or more service nodes 108', 108" are registered in the blockchain network 104, and any communication between the processing server 102 and one or more service nodes 108', 108" or between two or more service nodes 108', 108" can be hashed out and stored in the distributed ledger of the blockchain network 104 as disclosed herein.

In accordance with an embodiment, the processing server 102 within the blockchain network 104 can receive a fee for providing the service, which can include executing the validation for the two service nodes 108', 108" (i.e., bank nodes or issuers) before, for example, sending a blockchain node address and available services of a service node 108', 108" within the blockchain service network 120. In accordance with an embodiment, the fee can be provided through a subscription for each of the two service nodes 108', 108", a set fee per transaction, and/or a percentage of the transaction amount, and/or based on the number or volume of transactions executed by each of the service nodes 108', 108".

In accordance with an embodiment, the service nodes 108', 108" in the blockchain service network 120 can discover other service nodes 108', 108", in the blockchain service network 120, for example, via a broadcast across the blockchain service network 120, for example, using a certain flag that can be enable, and/or the service nodes 108', 108" can be discovered on an as needed basis by other service nodes 108', 108". In accordance with an embodiment, the processing server 102 can be configured to send out information to the service registry (i.e., each of the service nodes 108', 108" that subscribe to and/or are a part of the blockchain service network 120) about new service nodes 108', 108" including address (i.e., blockchain node address) and services being offered by the new service node 108', 108", and/or when new services are added to the blockchain network 104 by an existing service node 108', 108". In accordance with an embodiment, the processing server 102 and the service nodes 108', 108" in the network 120 can issue a blockchain call lookup to the processing server via the services being offered and the blockchain call lookup can return the services being offered along with a blockchain node address. In accordance with an embodiment, the services or functions offered by the service nodes 108', 108" can be accessed by other service nodes 108', 108" via an application programming interface (API) call via, for example, a peer-to-peer (P2P) connection between the service nodes 108', 108". In addition, in certain situations, multiple services or functions can be stacked by the service node 108', 108" providing the services and/or functions to another service node 108', 108" within the network 120.

In accordance with an embodiment, the blockchain network 104 may be comprised of a plurality of blocks, where each block is comprised of a block header and one or more data values. The data values may each be associated with services provided by the service nodes 108', 108" (i.e., issuers or issuing institutions), and may include, for example, services directed to country validations and/or smart contacts as disclosed herein. Each block header may include at least a timestamp, a block reference value, and a data reference value. The timestamp may be a stamp of a time when the block header is generated. The block reference value may be a reference to the previous block (e.g., determined via timestamp) in the blockchain. In some cases, the block reference value may be a hash value generated via the application of one or more hashing algorithms to the block header of the previous block. The data reference value may be a reference to the one or more data values included in the respective block. In some cases, the data reference value may be a hash value generated via the application of one or more hashing algorithms, which may be the same or different than those used in generation of the block reference value, to the one or more data values included in the block. The use of the reference values may ensure that the data stored in the blockchain is immutable, as a modification to any data value can be detected via generation of the data reference value, as it would thus differ from the value stored in the block header, which would, in turn result in a different block reference value for the subsequent block, which would carry on through every subsequent block. As a result, no block header or data value may be modified without requiring modification to every single subsequent block in the blockchain. As each node in the blockchain network 104 may store the blockchain, no modification to the blockchain may be performed without compromise of every single node.

In accordance with an embodiment, the processing server 102 of the blockchain network 104 may receive the data value corresponding to the services offered by the one or more service nodes 108', 108" (i.e., issuers or issuing institutions), which may be included in a newly generated block (e.g., and incorporated into the data reference value in the respective block header). The generated block may be validated by other nodes in the blockchain network 104 using traditional methods, which may include independent generation of the reference values and validation thereof. Once validation is completed, the newly generated block may be added to the blockchain and provisioned to all of the nodes in the blockchain network 104. In some embodiments, validation of the data prior to addition of the new block may include authentication of the service nodes 108', 108". In some instances, authentication may be performed via a password or other unique value(s) provided by the service node 108', 108" for authentication thereof. In other instances, the blockchain network 104 may provision a private key to the service node 108', 108" of a cryptographic key pair. In such an instance, the service node 108', 108" may generate a digital signature using their private key, which may be submitted to the processing server 102 with their services provided. In these instances, the processing server 102 may validate the digital signature using the corresponding public key and associated signature validation algorithms to authenticate the service node 108', 108".

In some cases, the other nodes comprising the blockchain network 104 may also validate the digital signature as part of the validation process before confirming a new block for addition to the blockchain.

In accordance with an embodiment, the blockchain network 104 is a private or permissioned blockchain. In such embodiments, only authorized entities (e.g., service nodes 108', 108") may have access to the data stored in the blockchain. In these embodiments, access may be limited to the authorized service nodes 108', 108" using any suitable method, such as being stored in a private network or location, being encrypted, etc. In cases where one blockchain may be used to store data for multiple different service nodes 108', 108", the information may be stored in an encrypted format.

In accordance with an embodiment, for example, the processing server 102 can be configured to perform country validations, for example, for transactions between financial institutions, banks, and/or security exchanges (i.e., a financial node, a bank node, and/or a security exchange node), and/or smart contacts (or computer protocols), for example, for execution of commercial transactions or enforcement of a legal agreement. There are currently no platforms to facilitate payments including cross-border payments, and more particularly, a centralized node that can facilitate transactions including pre-validation of rules and regulation for cross-border transactions including compliance with banking regulation for countries involved in the transaction. Country validations can include validation of International Bank Account Numbers (IBAN) for domestic (or local) and/or international payment transactions. In accordance with an embodiment, smart contacts can be used in financial services, banks, and/or security exchanges, for example, for trade clearing and settlement, healthcare (i.e., transfer of electronic medical records), technology, media and telecommunication (i.e., royalty distribution), and/or cross-industry payments (i.e., transfer of payments for various peer-to-peer applications in lending, insurance, energy credits, etc.).

In accordance with an embodiment, the service can be a cross-border payment between, for example, two bank nodes. In a cross-border payment between, for example, two bank nodes, each of the bank node must validate that the country validations and/or account numbers, for example, IBAN, are correct and secure before the transaction can be executed. Thus, if you have multiple banks involved in a rather large transaction that requires multiple transactions, the validation is implemented at each bank node, which can create a duplication of work for each of the bank nodes. In accordance with an embodiment, if the validation of the cross-border payment is transferred to the processing server 102 with a blockchain network 104, the services nodes 108', 108" (bank nodes) would not need to perform the upfront validation (i.e., validate currency, validate account number, confirm compliance with country related rules), before, for example, a peer-to-peer (P2P) communication is established between the two service nodes 108', 108" (two bank nodes) for a cross-border payment.

In addition, if a large settlement instruction or group of instructions are to be performed, the processing server 102 can validate the instructions for the service nodes 108', 108" (i.e., banks or issuers), so that the service nodes 108', 108" can perform the validation only one and the validation can be reused for subsequent settlements or instructions, which subsequent settlements or instructions are part of the large settlement instruction or group of instructions.

Processing Server

Figure 2:
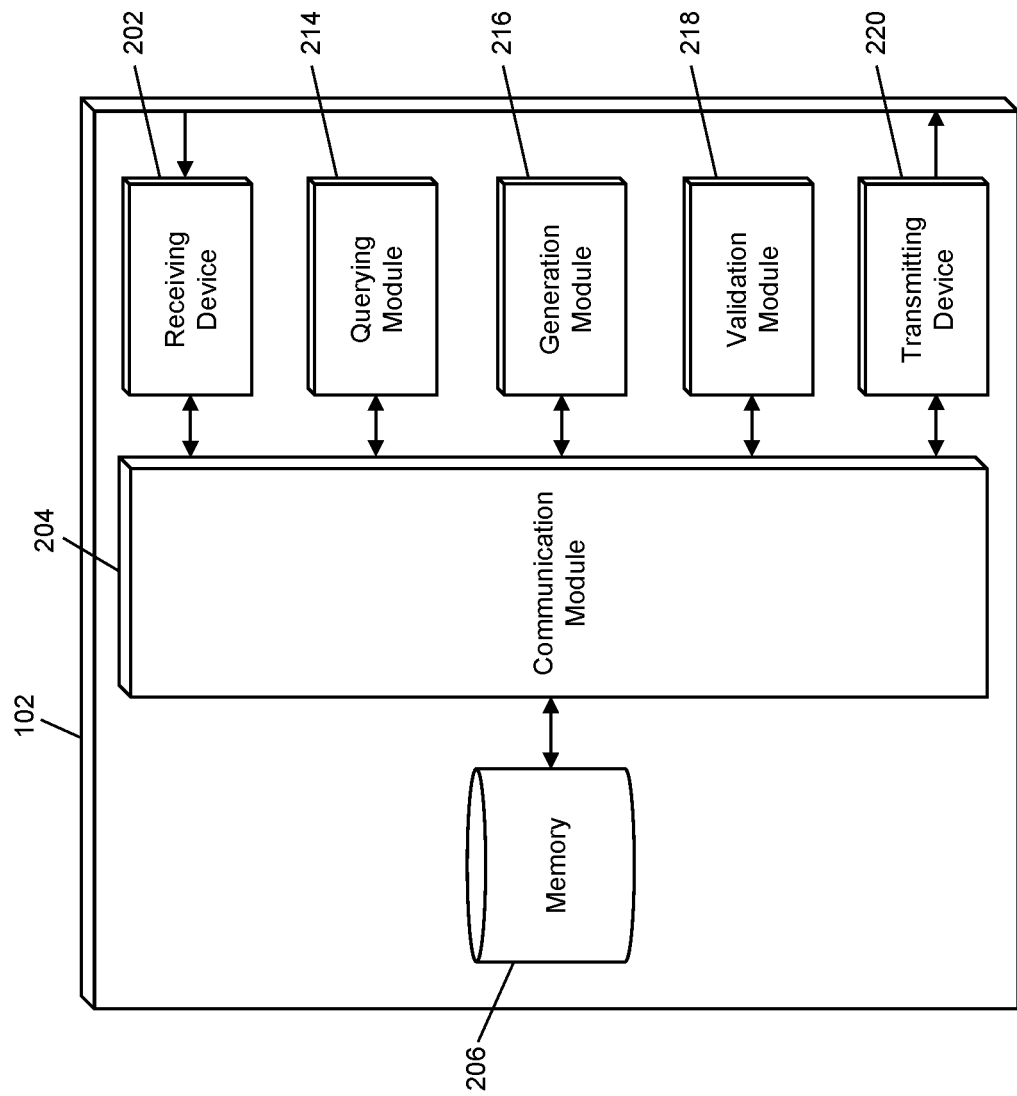
FIG. 2 is a block diagram illustrating a processing server of the system of FIG. 1 for providing a service node within a blockchain network in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from service nodes 108', 108", merchant systems 112, other nodes in the blockchain network 104, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by service nodes 108', 108", which may be superimposed or otherwise encoded with available application programming interfaces (APIs) and/or services. In some cases, the application programming interfaces (APIs) and/or services may be accompanied by authentication information to authenticate the service nodes 108', 108" (i.e., issuers or issuing institutions) as the source of the data, which may, in some instances, include a digital signature generated via a private key associated with a service node 108', 108" (i.e., issuer or issuing institution). The receiving device 202 may also be configured to receive data signals electronically transmitted by other nodes in the blockchain network 104 and/or merchant systems 112, as applicable.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory may also be configured to store any additional data that may be used by the processing server 102 in performing the functions discussed herein, such as hashing algorithms for generating reference values for the blockchain, communication data for communicating with other blockchain nodes and other computing devices, access data for providing access to merchant systems 112 to blockchain data, public keys corresponding to private keys provisioned to service nodes 108', 108" for verification of digital signatures, etc.

The processing server 102 may include a querying module 214. The querying module 214 may be configured to execute queries on databases to identify information. The querying module 214 may receive one or more data values or query strings and may execute a query string based thereon on an indicated database, such as the memory 206, to identify information stored therein. The querying module 214 may then output the identified information to an appropriate engine or module of the processing server 102 as necessary. The querying module 214 may, for example, execute a query on the memory 206 to identify a the most recent block added to the blockchain (e.g., based on timestamp) as part of the process in generating a new block, or may execute a query on the memory 206 to identify a public key corresponding to the service nodes 108', 108" for use in validating a digital signature provided with data associated with the type of services or functions provided by the first service node 108', 108" for authentication thereof.

The processing server 102 may also include a generation module 216. The generation module 216 may be configured to generate data for the processing server 102 for use in performing the functions discussed herein. The generation module 216 may receive instructions as input, may generate data based on the instructions, and may output the generated data to one or more modules or engines of the processing server 102. For example, the generation module 216 may be configured to generate new blocks and new block headers for confirmation and addition into the blockchain. The generation module 216 may also be configured to generate notifications regarding the application programming interfaces (APIs) and/or services provided by the service nodes 108', 108". The generation module 216 may also be configured to generate hash values via the application of hashing algorithms to data, such as for the generation of reference values to be included in the block header of a newly generated block. In some cases, the generation of hash values may be performed via a separate hashing module included in the processing server 102.

The processing server 102 may also include a validation module 218. The validation module 218 may be configured to validate data for the processing server 102 and the service nodes 108', 108" for use in performing the functions discussed herein. The validation module 218 may receive instructions as input, may validate data as instructed, and may output a result of the validation to another module or engine of the processing server 102. For example, the validation module 218 may be configured to validate digital signatures to authenticate the source of the application programming interfaces (APIs) and/or services from the service nodes 108', 108", validate newly generated blocks (e.g., by confirming reference values), and validate a request for access to blockchain data (e.g., submitted by another service node 108', 108"), etc.

The processing server 102 may also include a transmitting device 220. The transmitting device 220 may be configured to transmit data over one or more networks via one or more network protocols. In some instances, the transmitting device 220 may be configured to transmit data to the service nodes 108', 108" in the blockchain network 120, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other nodes in the blockchain network 120, including service nodes 108', 108", as applicable, that are superimposed or otherwise encoded with newly generated blocks for validation and confirmation thereof. The transmitting device 220 may also be configured to electronically transmit data signals superimposed or otherwise encoded with confirmed blocks to the service nodes 108', 108" for the updating of data associated with the type of services or functions provided by the service nodes 108', 108". In some instances, the transmitting device 220 may be configured to electronically transmit data signals to service nodes 108', 108", which may be superimposed or otherwise encoded with notifications regarding the updating of data associated with the type of services or functions provided by the service nodes 108', 108" (e.g., the successful generation of a new block, etc.). In some embodiments, the transmitting device 220 may be configured to electronically transmit data signals to the service nodes 108', 108" for the provisioning of a cryptographic key pair thereto for use in generating digital signatures for use during submissions of data associated with the type of services or functions provided by the service nodes 108', 108".

Process for Providing a Service Node within a Blockchain Network

Figure 3:
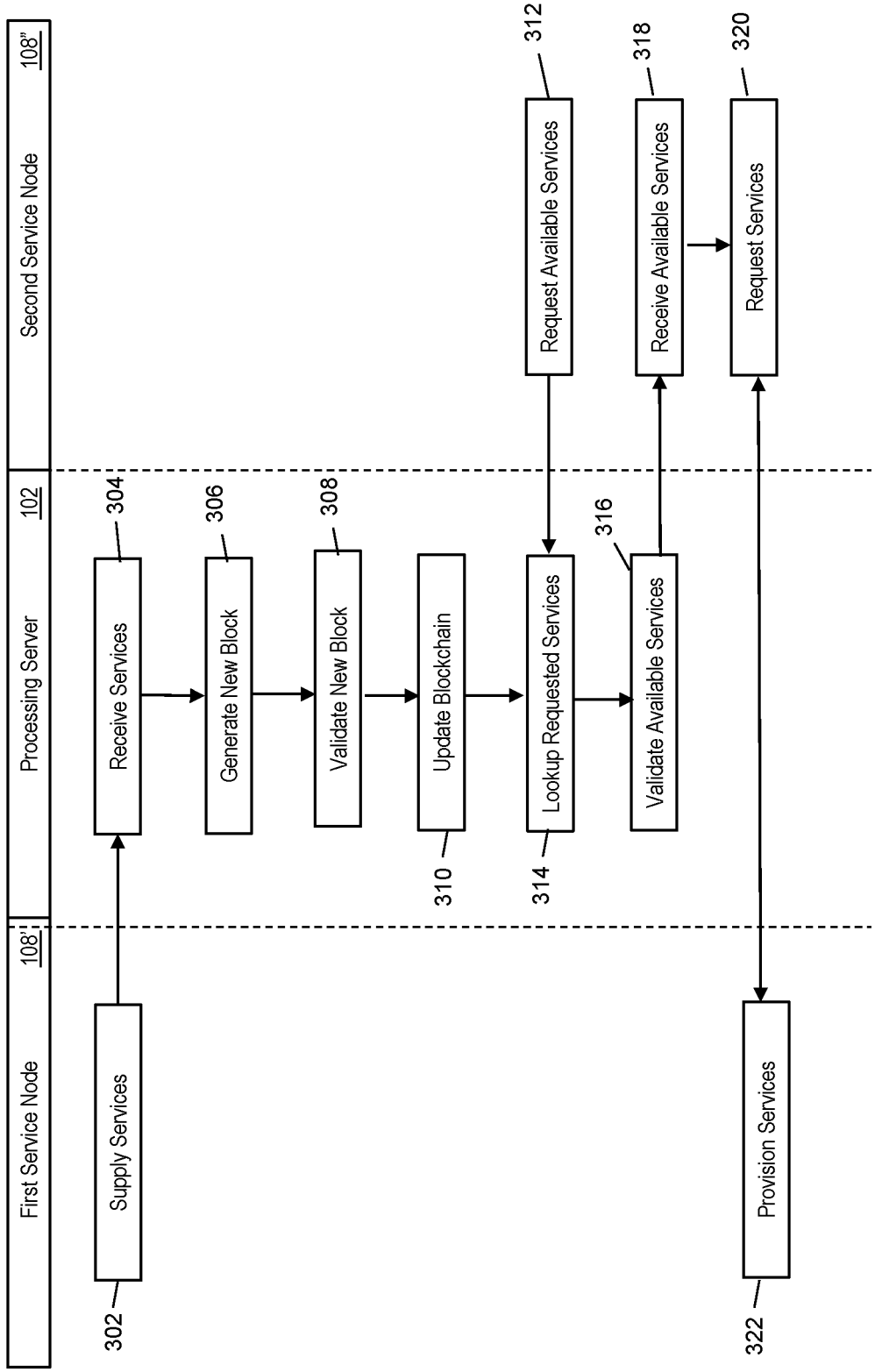
FIG. 3 is a flow diagram illustrating a process for providing a service node within a blockchain network in the system of FIG. 1 in accordance with exemplary embodiments.

FIG. 3 illustrates a process for providing a first service node 108' within a blockchain network 120 to a second service node 108".

In step 302, the first service node 108', as operated, for example, by an issuer, issuing institution, or bank, may submit or supply new data associated with their services or functions to the processing server 102 using a suitable interface associated therewith. In step 304, the receiving device 202 of the processing server 102 may receive the data associated with the type of services and functions provided by the first service node 108'. In some cases, the data associated with the type of services or functions provided by the first service node 108' may be accompanied by a digital signature or other authentication information. In such cases, the validation module 218 of the processing server 102 may validate the authentication information upon receipt to ensure the authenticity of the first service node 108' and the data submitted thereby.

In step 306, the generation module 216 of the processing server 102 may generate a new block for addition to the blockchain. The new block may be comprised of at least a block header and one or more data values, wherein the one or more data values includes the data associated with services or functions received from the first service node 108'. The block header of the new block may include at least a timestamp, a transaction reference value associated with the one or more data values, and a block reference value associated with the most recent block that was previously added to the blockchain. In some embodiments, the reference values may be hash values generated via the application of one or more hashing algorithms to the respective data. In some cases, the processing server 102 may encrypt the one or more data values prior to the generation of the new block.

In step 308, the processing server 102 may validate the new block. Validation of the new block may include validation of the reference values, such as by computing new reference values using the respective data and corresponding hashing algorithm(s) to ensure that the correct values were previously identified. Validation of the new block may also include electronic transmission of the new block, by the transmitting device 220 of the processing server 102, to a plurality of other computing nodes in the blockchain network 104, for confirmation thereby. In such cases, the computing nodes may use any suitable confirmation technique and method, such as proof of work, to confirm the newly generated block. The receiving device 202 of the processing server 102 may receive a response from one or more of the computing nodes indicating that the block is successfully confirmed to complete the validation.

In step 310, the processing server 102 may update the blockchain, such as by electronically transmitting (e.g., via the transmitting device 220 of the processing server 102) the confirmed block to each node in the blockchain network 104.

In step 312, a second service node 108" sends a request, for example, a discovery request for services or functions of other service nodes 108' within the blockchain network 120. The request from the second service node 108" can be sent to the processing server 102 via a blockchain call lookup for the services or functions requested by the second service node 108". In step 314, the processing server 102 executes a blockchain lookup for the services or functions requested by the second service node 108" within the blockchain network 104. In step 316, the processing server 102, can validate the request from the second service node for the services or functions requested by the second service node 108" and returns the services or functions requested by the second service node 108" in step 318. In step 318, the services or functions requested can include a listing of service or functions available including a blockchain node address and/or for example, an IP address for the application programming interface (API) of the first service node 108'.

In accordance with an embodiment, in step 320, the second service node 108" sends a request to the first service node 108' for the services or functions requested, which are provisioned to the second service node 108". In accordance with an embodiment, the provisioning of the services or functions from the first service node 108' to the second service node 108" can be a peer-to-peer (P2P) connection between the first service node 108' and the second service node 108". In addition, a plurality of service or functions can be stacked together in the availing of services or functions between the first service node 108' and the second service node 108". In accordance with an embodiment, the services or functions provisioned by the first service node 108' to the second service node 108" can be recorded in the blockchain as discussed herein. For example, communications between the at least the first service node and the second service node can be hashed, and stored in a distributed ledger of the blockchain Exemplary Method for Providing a Service Node within a Blockchain Network In step 402, a blockchain comprised of a plurality of blocks may be stored in a memory (e.g., the memory 206) of a computing node (e.g., the processing server 102), wherein each block is comprised of at least a block header and one or more data values, wherein the one or more data values included in a most recent block includes at least one data point associated with services or functions of at least a first service node 108'. In step 404, receiving, by a receiving device of the processing server, a request from a second service node 108" may be received by a receiving device (e.g., the receiving device 202) of the processing server 102 for the list of services or functions of the at least a first service node 108' within the blockchain network.

In step 406, the request from the second service node for the list of services or functions of the at least a first service node 108' within the blockchain network may be validated by the processing server 102 (for example, by a validation module 218 of the processing server 102). In step 408, the list of service or functions of the at least the first service node 108' may be electronically transmitted, by a transmitting device (e.g., the transmitting device 220) of the processing server 102 to the second service node 108".

In one embodiment, the receiving device of the processing server 102 can be configured to receive a new list of services or functions from the first service node 108', wherein the new list of services or functions from the first service node 108' include one or more data points associated with the new list of services or functions. A generation module 216 of the processing server 102 can generate a new block header comprised of at least a timestamp, a reference value associated with the block header comprising the most recent block, and a reference value associated with the one or more data points associated with the new list of services or functions from the first service node. The generation module 216 of the processing server 102 can also be configured to generate a new block comprised of at least the generated new block header and the one or more data points associated with the new list of services or functions from the first service node. The validation module 218 of the processing server 102 can validate the generated new block, for example, by electronically transmitting, by the transmitting device 220 of the processing server 102, the generated new block to a plurality of blockchain nodes associated with the blockchain network 104, and receiving, by the receiving device 202 of the processing server 102, an indication of successful validation of the generated new block from at least one of the plurality of blockchain nodes. In one embodiment, the new list of services or functions can be received, for example, from the first service node 108' via a transmission control protocol (TCP) connection.

In another further embodiment, the method 400 can also include broadcasting the new list of services or functions from the first service node 108' to the blockchain service network 120 after the new block for the list of services or functions have been validated on the blockchain. In accordance with an embodiment, the list of service or functions of the at least the first service node 108' within the blockchain network 104 can include an application programming interface or a functionality that can be provisioned to the second service node 108" from the at least the first service node 108' in a peer-to-peer communication.

In accordance with another embodiment, the list of services or functions of the at least the first service node 108' can be discovered by a blockchain call lookup received from the second service node 108". For example, the list of services or functions can include an application programming interface (API) or service that is configured to confirm that a transaction is in compliance with banking regulations and/or a smart contact. In addition, the processing server 102 can receive a fee from, for example, the at least the first service node 108' and/or the second service node 108", for each of the validation of the list of services or functions of the at least the first service node 108' and/or, alternatively, the at least the first service node 108' and/or the second service node 108" can pay a subscription fee to the processing server 102 for the validation of the list of services or functions of the at least the first node 108'.

In accordance with an embodiment, communications received between the at least the first service node 108' and the second service node 108" can include data points associated with a service or function exchanged between the at least the first service node 108' and the second service node 108", and a new block header can be generated, which can include at least a timestamp, a reference value associated with the block header comprising the most recent block, and a reference value associated with the one or data points associated with the service or function exchanged between the at least the first service node 108' and the second service node 108", and a blockchain can be recorded comprised of a plurality of blocks, wherein each block is comprised of at least a block header and one or more data points associated with the service or function exchanged between the at least the first service node 108' and the second service node 108". In yet another embodiment, communications between the at least the first service node 108' and the second service node 108" can be hashed, and the hashed communications can be stored in a distributed ledger of the blockchain network 104.

Computer System Architecture

Figure 4:
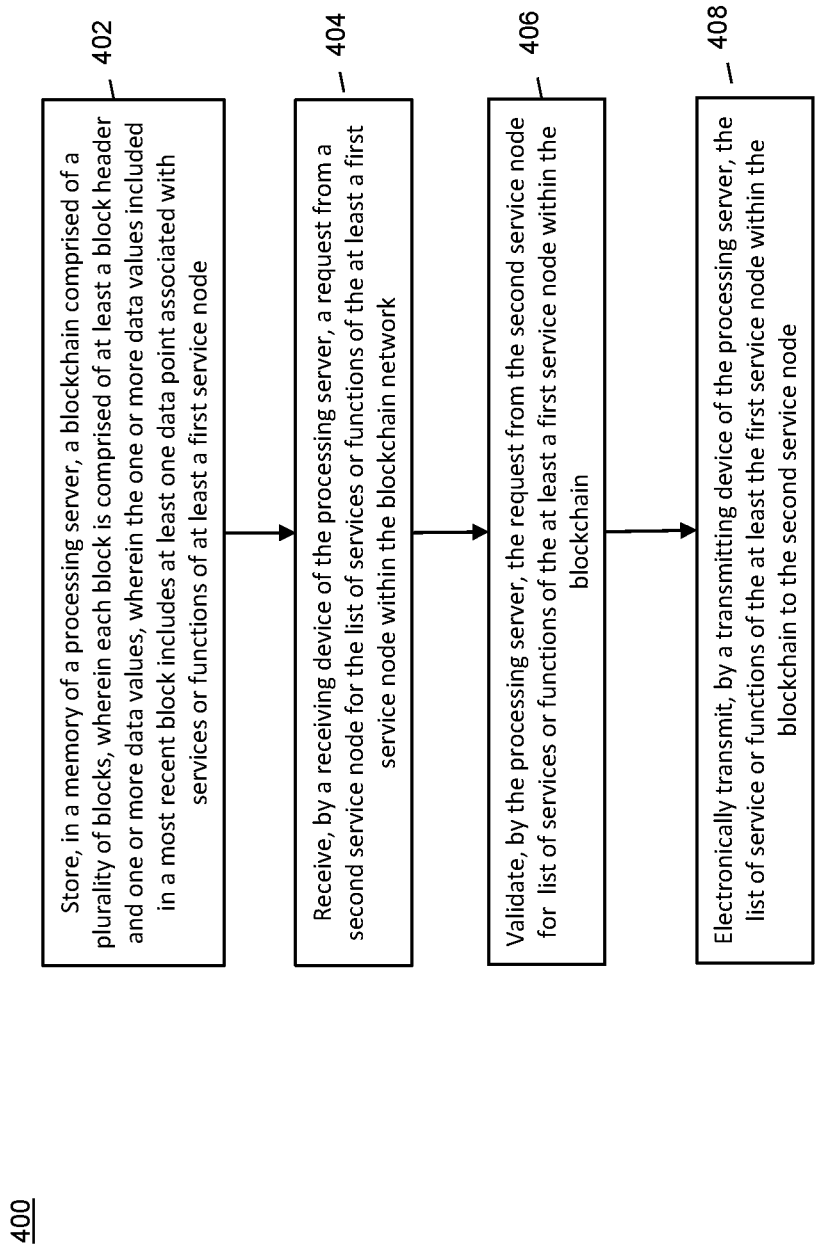
FIG. 4 is a flow chart illustrating an exemplary method for providing a service node within a blockchain network in accordance with exemplary embodiments.
Figure 5:
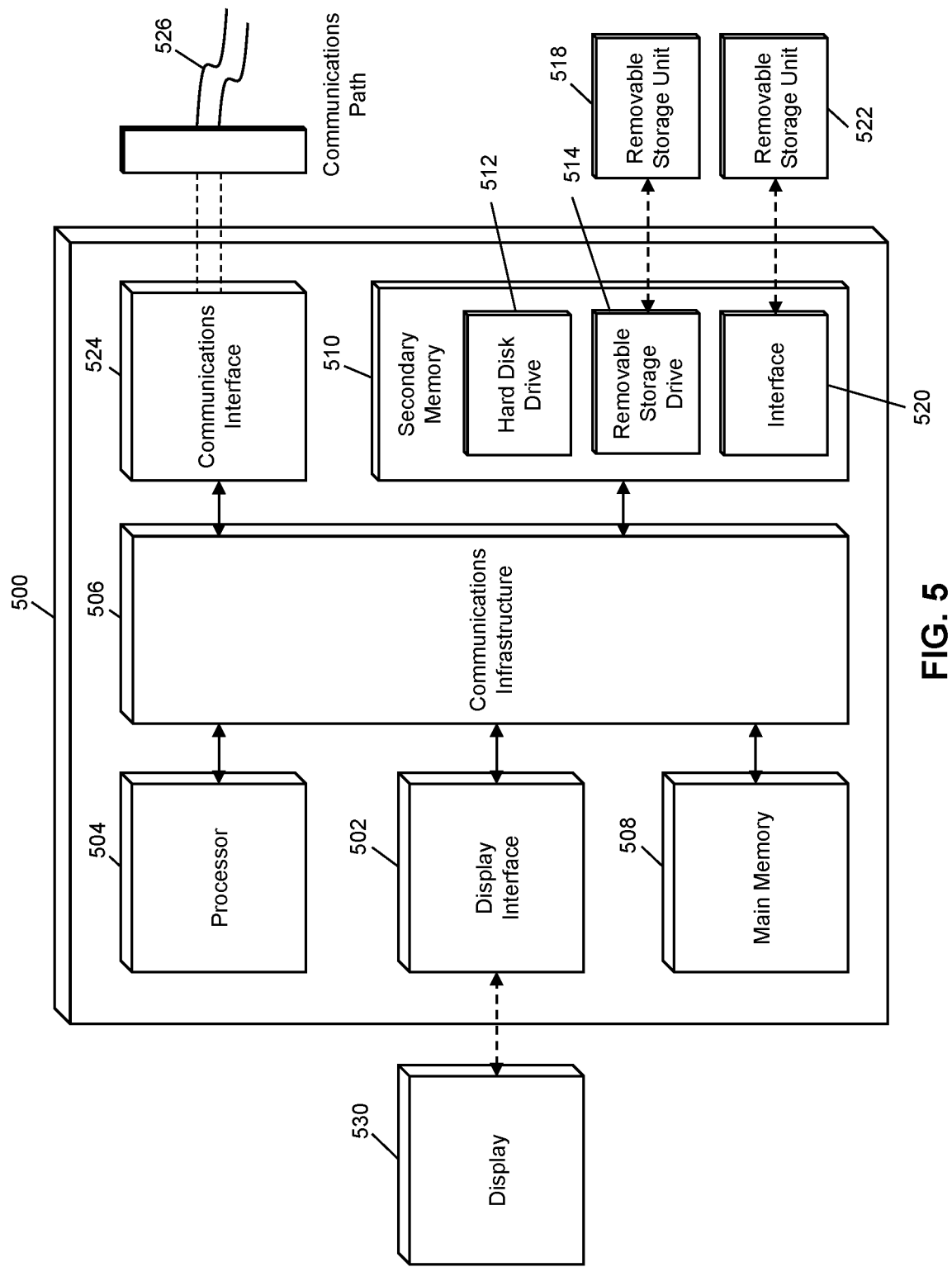
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), lightemitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing a service node within a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of providing a service node within a blockchain, the method comprising:
   authenticating, by a processing server, a plurality of service nodes and an API and functionality that provides services and functions otherwise unavailable to nodes of a peer-to-peer (P2P) network;
   storing, in a memory of a processing server, a blockchain network;
   receiving, by a receiving device of the processing server, a request from a requesting service node for a list of services and functions;
   validating, by the processing server, that the services and functions being offered in the list of services and functions of the plurality of service nodes within the blockchain are in compliance with banking regulations and a smart contract; and
   electronically transmitting, by a transmitting device of the processing server, one or more of the services and functions being offered in the list of services and functions of the plurality of service nodes within the blockchain to the requesting service node, and wherein the one or more of the services and functions being electronically transmitted to the requesting service node have been validated to be in compliance with the banking regulations and the smart contract.

2. The method of claim 1, wherein the blockchain network includes a plurality of blocks, the method further comprising:
   receiving, by the receiving device of the processing server, a new list of services and functions from the plurality of service nodes, wherein the new list of services and functions from the plurality of service nodes includes one or more data points associated with the new list of services and functions;
   generating, by the processing server, a block header comprised of at least a timestamp, a reference value associated with the block header comprising a most recent block, and a reference value associated with the one or more data points associated with the new list of services and functions from the plurality of service nodes;
   generating, by the processing server, a new block comprised of at least the generated block header and the one or more data points associated with the new list of services and functions from the plurality of service nodes; and
   validating, by the processing server, the generated new block, and wherein the validation of the generated new block comprises:
      electronically transmitting, by the transmitting device of the processing server, the generated new block to a plurality of blockchain nodes associated with the blockchain; and
      receiving, by the receiving device of the processing server, an indication of successful validation of the generated new block from at least one of the plurality of blockchain nodes.

3. The method of claim 2, further comprising:
   receiving, by the receiving device of the processing server, the new list of services and functions from the plurality of service nodes via a transmission control protocol (TCP) connection.

4. The method of claim 2, further comprising:
   broadcasting, by the processing server, services and functions from the new list of services and functions from the plurality of service nodes to the blockchain network after the new block for the list of services and functions have been validated on the blockchain and for compliance with the banking regulations and/or the smart contract.

5. The method of claim 1, further comprising:
discovering, in the processing server, the list of services and functions of the plurality of service nodes by a blockchain call lookup received from the requesting service node.

6. The method of claim 1, wherein the processing server receives a fee from the plurality of service nodes and/or the requesting service node for the validation of the services and functions being offered in the list of services and functions of the plurality of service nodes, and/or the requesting service node pays a subscription fee to the processing server for the services and functions being offered in the list of services and functions of the plurality of service nodes.

7. The method of claim 1, wherein the blockchain network includes a plurality of blocks, the method further comprising:
receiving, by the receiving device of the processing server, communications between the plurality of service nodes and the requesting service node, wherein the communications include data points associated with a service and function exchanged between the plurality of service nodes and the requesting service node;
generating, by the processing server, a block header comprised of at least a timestamp, a reference value associated with the block header comprising a most recent block, and a reference value associated with the one or data points associated with the service and function exchanged between the plurality of service nodes and the service node; and
recording, in the memory of the processing server, a blockchain comprised of a plurality of blocks, wherein each block is comprised of at least a block header and one or more data points associated with the service and function exchanged between the plurality of service nodes and the requesting service node.

8. The method of claim 1, comprising:
hashing communications between the plurality of service nodes and the requesting service node; and
storing, in the memory of the processing server, the hashed communications in a distributed ledger of the blockchain.

9. A system for providing a service node within a blockchain, the system comprising:
a blockchain network; and
a processing server configured to:
authenticate the plurality of service nodes and services and functions of the plurality of service nodes;
receive a request from a requesting service node for a list of services functions;
validate that the services and functions being offered in the list of services and functions of the plurality of service nodes within the blockchain are in compliance with banking regulations and a smart contract; and
electronically transmitting one or more services and functions being offered in the list of services and functions of the plurality of service nodes within the blockchain to the requesting service node, and wherein the one or more of the services and functions being electronically transmitted to the requesting service node have been validated to be in compliance with the banking regulations and the smart contract.

10. The system of claim 9,
wherein the blockchain network includes a plurality of blocks, and
wherein the processing server is configured to:
receive a new list of services and functions from the plurality of service nodes, the new list of services and functions from the plurality of service nodes including one or more data points associated with the new list of services and functions;
generate a block header comprised of at least a timestamp, a reference value associated with the block header comprising a most recent block, and a reference value associated with the one or more data points associated with the new list of services and functions from the plurality of service nodes;
generate a new block comprised of at least the generated block header and the one or more data points associated with the new list of services and functions from the at least the plurality of service nodes; and
validate the generated new block, and wherein the validation of the generated new block comprises:
electronically transmitting the generated new block to a plurality of blockchain nodes associated with the blockchain; and
receiving an indication of successful validation of the generated new block from at least one of the plurality of blockchain nodes.

11. The system of claim 10, wherein the receiving device of the processing server is configured to receive the new list of services and functions from the plurality of service nodes via a transmission control protocol (TCP) connection.

12. The system of claim 10, wherein the processing server is configured to broadcast services and functions from the new list of services and functions from the plurality of service nodes to the blockchain network after the new block for the list of services and functions have been validated on the blockchain and for compliance with the banking regulations and/or the smart contract.

13. The system of claim 9, wherein the processing server is configured to discover the list of services and functions of the plurality of service nodes by a blockchain call lookup received from the requesting service node.

14. The system of claim 9, wherein the processing server receives a fee from the plurality of service nodes and/or the requesting service node for the validation of the services and functions being offered in the list of services and functions of the plurality of service nodes, and/or the plurality of service nodes and/or the requesting service node pays a subscription fee to the processing server for the services and functions being offered in the list of services and functions of the plurality of service nodes.

15. The system of claim 9,
wherein the blockchain network includes a plurality of blocks, and
wherein the processing server is configured to:
receive communications between the plurality of service nodes and the requesting service node, the communications including data points associated with a service and function exchanged between the plurality of service nodes and the requesting service node;
generate a block header comprised of at least a timestamp, a reference value associated with the block header comprising a most recent block, and a reference value associated with the one or data points associated with the service and function exchanged between the plurality of service nodes and the requesting service node; and record in the memory of the processing server, a blockchain comprised of a plurality of blocks, wherein each block is comprised of at least a block header and one or more data points associated with the service and function exchanged between the plurality of service nodes and the requesting service node.

16. The system of claim 9, wherein communications between the plurality of service nodes and the requesting service node are hashed, and the hashed communications are stored in a distributed ledger of the blockchain.

* * * * *